(12) United States Patent
Kawasaki

(10) Patent No.: US 10,334,121 B2
(45) Date of Patent: Jun. 25, 2019

(54) IMAGE FORMING APPARATUS

(71) Applicant: Konica Minolta, Inc., Chiyoda-ku, Tokyo (JP)

(72) Inventor: Tetsu Kawasaki, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/682,589

(22) Filed: Aug. 22, 2017

(65) Prior Publication Data

US 2018/0077296 A1 Mar. 15, 2018

(30) Foreign Application Priority Data

Sep. 15, 2016 (JP) ................................ 2016-180562

(51) Int. Cl.
*H04N 1/00* (2006.01)
*G03G 15/00* (2006.01)
(Continued)

(52) U.S. Cl.
CPC ......... *H04N 1/00055* (2013.01); *G03G 15/55* (2013.01); *G03G 15/556* (2013.01); *G06F 3/1208* (2013.01); *G06F 3/1229* (2013.01); *G06F 3/1257* (2013.01); *G06F 3/1285* (2013.01); *H04N 1/00005* (2013.01); *H04N 1/0005* (2013.01); *H04N 1/00015* (2013.01); *H04N 1/00087* (2013.01); *H04N 1/00344* (2013.01); *H04N 1/46* (2013.01);
(Continued)

(58) Field of Classification Search
CPC ................. G03G 15/55; G03G 15/556; G03G 2215/00126
See application file for complete search history.

(56) References Cited

U.S. PATENT DOCUMENTS 8,654,370 B2 * 2/2014 Tsubouchi ......... G03G 15/5029
358/1.13
2008/0016450 A1 1/2008 Aono
(Continued)

FOREIGN PATENT DOCUMENTS

CN 101098384 A 1/2008
EP 0934828 A2 8/1999
(Continued)

OTHER PUBLICATIONS

Amada (JP 2009-128696 A), Jun. 2009, JPO Computer Translation.*
(Continued)

*Primary Examiner* — Erika J Villaluna
(74) *Attorney, Agent, or Firm* — Buchanan Ingersoll & Rooney PC

(57) ABSTRACT

Disclosed is an image forming apparatus, including: a job receiver that receives a print job; a printer that executes an image forming in accordance with the print job received by the job receiver; and a hardware processor that: receives an adjustment content and a setting of an execution starting condition of an adjustment for an adjustment item relating to the image forming, and registers the adjustment content and the execution starting condition as a profile; and executes the adjustment in accordance with the adjustment content set in the registered profile when the execution starting condition set in the profile is satisfied.

9 Claims, 9 Drawing Sheets

(51) Int. Cl.
*G06F 3/12* (2006.01)
*H04N 1/46* (2006.01)
*H04N 1/60* (2006.01)

(52) U.S. Cl.
CPC ... *H04N 1/603* (2013.01); *G03G 2215/00569* (2013.01); *G03G 2215/0106* (2013.01); *G03G 2215/0112* (2013.01); *G06F 3/1204* (2013.01); *G06F 3/1219* (2013.01); *H04N 1/00037* (2013.01); *H04N 1/6036* (2013.01)

(56) References Cited

U.S. PATENT DOCUMENTS

| | | | |
|---|---|---|---|
| 2008/0123121 A1* | 5/2008 | Sagimori | G03G 15/5062 358/1.9 |
| 2010/0302597 A1 | 12/2010 | Sugiyama | |
| 2012/0188596 A1 | 7/2012 | Niles et al. | |

FOREIGN PATENT DOCUMENTS

| | | | |
|---|---|---|---|
| JP | 2002-244503 | A | 8/2002 |
| JP | 2007281773 | A | 10/2007 |
| JP | 2009-128696 | A | 6/2009 |
| JP | 2011-161813 | A | 8/2011 |

OTHER PUBLICATIONS

Extended Search Report issued by the European Patent Office dated Feb. 6, 2018 in corresponding European Application No. 17188006.5 (12 pages).

Office Action issued in corresponding European Patent Application No. 17188006.5-1221, dated Mar. 13, 2019 (7 pages).

Notification of Reasons for Refusal issued in corresponding Chinese Patent Application No. 2017108266543, dated Jan. 18, 2019, with English Translation (16 pages).

\* cited by examiner

FIG.9

IN CASE THAT BOTH OF EXECUTION STARTING CONDITIONS OF
FIRST AND SECOND PROFILES ARE SATISFIED

FIRST PROFILE 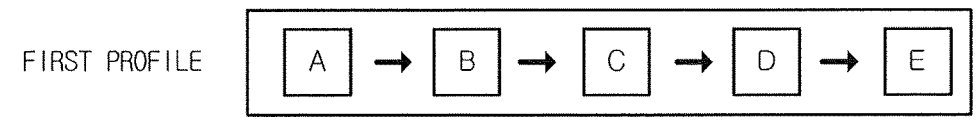

SECOND PROFILE 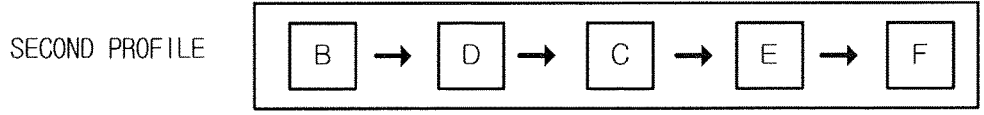

EXTRACT ADJUSTMENT ITEMS
WITH RESPECT TO OVERLAPPED ADJUSTMENT ITEMS,
EXTRACT EACH ITEM ONLY ONCE

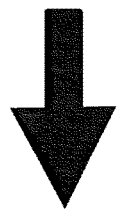

IN CASE THAT ADJUSTMENT ORDER OF
OVERLAPPED ADJUSTMENT ITEMS IS DIFFERENT
BETWEEN FIRST AND SECOND PROFILES,
ADJUSTMENT ORDER IS DETERMINED BY
PRIORITY WHICH IS PREVIOUSLY SET TO
ADJUSTMENT ITEMS

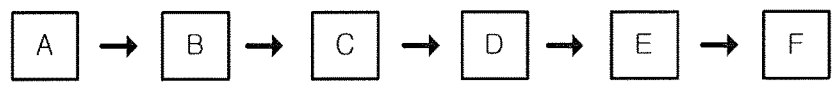

IMAGE FORMING APPARATUS

Japanese Patent Application No. 2016-180562 filed on Sep. 15, 2016, including description, claims, drawings, and abstract the entire disclosure is incorporated herein by reference in its entirety.

BACKGROUND

Technological Field

The present invention relates to an image forming apparatus for executing the adjustment for various types of adjustment items relating to the image forming.

Description of the Related Art

In general, an image forming apparatus, such as a printer or the like, has various types of adjustment items relating to the image forming, such as the color registration adjustment, the highest density adjustment and the like, and periodically executes the adjustment to secure the image quality in a specified level or more. Further, there are some cases in which the adjustment for the necessary adjustment item is executed not only periodically but also at an optional timing which is set by a user. For example, in case that a user wants to certainly secure the image quality in a specified level or more in a print job which to be executed next, the adjustment for the adjustment items related to the print job is executed.

However, in a conventional image forming apparatus, in order to secure the image quality which is expected by a user, the user must judge the timing of the execution of the adjustment, the adjustment item to be adjusted, and the like each time. It is troublesome for a user to grasp the timing of the execution of the adjustment and the adjustment contents to be adjusted at each timing, for example, in case that an image is formed under the specific image forming condition, or in case that an image is not formed for a predetermined time. Therefore, in order to solve the above problem, the following method is disclosed.

In Japanese Patent Application Publication No. 2002-244503, the method for displaying only the necessary adjustment items according to the object of the adjustment, a user who executes the adjustment and the like in case that the adjustment item to be adjusted is selected, is disclosed.

In Japanese Patent Application Publication No. 2009-128696, the method for informing a user of the adjustment necessary for the image forming when an image is formed under the predetermined image forming condition, is disclosed. In Japanese Patent Application Publication No. 2011-161813, the method for judging whether the adjustment is necessary according to the ration of the color pages and the resolution or for asking a user whether the adjustment is necessary, is disclosed.

In the method disclosed in Japanese Patent Application Publication No. 2002-244503, the necessary adjustment items are narrowed according to the object of the adjustment and a user who executes the adjustment. However, it is necessary that the adjustment items to be actually adjusted are judged by a user in accordance with the image forming condition of a print job to be executed (color/monochrome, text/picture, resolution, required image quality, black rate and the like), the mechanical condition (the first starting up in the day, the idling condition which is continued for a predetermined time, the number of sheets used in the printing after the previous adjustment, the environment temperature, the environment humidity and the like), and that the user instructs the image forming apparatus to execute the adjustment.

In Japanese Patent Application Publications No. 2009-128696 and No. 2011-161813, when an image is formed under the predetermined image forming condition, the image forming apparatus can inform a user of the necessary adjustment according to the above image forming condition. However, the adjustment items which are necessary for each image forming condition are previously set to the image forming apparatus. A user cannot customize the adjustment items to be adjusted for each image forming condition. Therefore, there are some cases in which the adjustment item which is not intended by a user is adjusted. As a result, the deterioration of the productivity and the waste of the consumables are caused.

SUMMARY

One of the objects of the present invention is to provide an image forming apparatus which can execute the adjustment which is intended by a user, automatically at a suitable timing.

To achieve at least one of the abovementioned objects, according to an aspect of the present invention, an image forming apparatus reflecting one aspect of the present invention, comprises:

a job receiver that receives a print job;

a printer that executes an image forming in accordance with the print job received by the job receiver; and a hardware processor that:

receives an adjustment content and a setting of an execution starting condition of an adjustment for an adjustment item relating to the image forming, and registers the adjustment content and the execution starting condition as a profile; and executes the adjustment in accordance with the adjustment content set in the registered profile when the execution starting condition set in the profile is satisfied.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a view showing the situation in case that there are a plurality of profiles in which the execution starting condition is satisfied.

DETAILED DESCRIPTION OF PREFERRED EMBODIMENT

Hereinafter, one or more embodiments of the present invention will be described with reference to the drawings. However, the scope of the invention is not limited to the disclosed embodiments.

Figure 1:
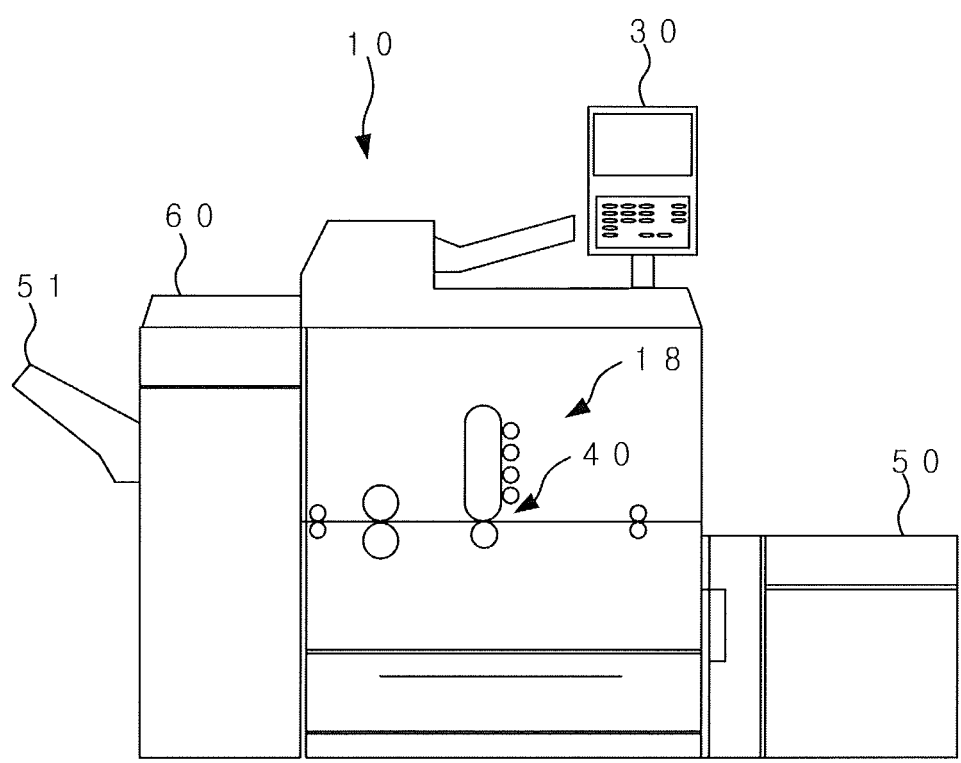
FIG. 1 is an explanation view showing the whole of the image forming apparatus according to the embodiment, and the main parts relating to the image forming.

FIG. 1 shows the image forming apparatus 10 according to the embodiment. The image forming apparatus 10 is a so-called multi function peripheral (MFP) which has the function for executing jobs, such as a copy job for optically reading an original to print out the image of the original on a recording sheet, a scan job for storing the image data of the read original as a file and transmitting the image data to an external terminal, a print job for printing out an image on a recording sheet in accordance with the data received from an external terminal, and the like.

When the image forming apparatus 10 forms an image in accordance with a print job, the image forming apparatus 10 feeds a recording sheet stored in the sheet feeding unit 50 and forms the image by using the printer unit 18. After the post-processing designated in the print job is carried out for the recording sheet by the post-processing unit 60, the post-processed recording sheet is discharged to the sheet discharge unit 51. The printer unit 18 is configured by a plurality of mechanisms including the fixing unit 40 for fixing the image on the recording sheet.

In this embodiment, the image forming apparatus 10 has various types of adjustment items relating to the image forming, such as the color registration adjustment, the highest density adjustment and the like, and secures the image quality in a specified level or more by adjusting the setting values and the like of each unit corresponding to the adjustment item to be adjusted. Hereinafter, the process for executing the above adjustment is referred to as the image quality secureness adjustment.

Further, in this embodiment, the image forming apparatus 10 receives the adjustment contents to be adjusted when the above image quality secureness adjustment is executed, and the setting of the execution starting condition for executing the image quality secureness adjustment from a user via the operation panel 30, and registers the received adjustment contents and the execution starting condition as the profile. When the execution starting condition which is set in the registered profile is satisfied, the above image quality secureness adjustment is executed in accordance with the adjustment contents set in the profile. Thereby, it is possible to automatically execute the image quality secureness adjustment which is intended by a user, at a suitable timing.

In the embodiment, the image forming apparatus 10 also executes the image quality secureness adjustment in case of one of the following situations (1) to (3) other than in case that the execution starting condition which is set in the profile is satisfied.

(1) In case that the designation of the profile is included in the print job to be executed next, the above image quality secureness adjustment is executed in accordance with the adjustment contents set in the designated profile immediately before the execution of the print job.

(2) When the designation of the profile in the list of the profiles registered in the image forming apparatus is received and the execution starting instruction for starting the execution of the adjustment set in the designated profile is received, the above image quality secureness adjustment is executed in accordance with the adjustment contents set in the designated profile.

(3) The image forming apparatus 10 counts the number of recording sheets on which the images are formed. When the counted number of recording sheets reaches the predetermined value, the image quality secureness adjustment is executed for the predetermined adjustment items and the counted number is reset. In case that the image quality secureness adjustment is executed for the predetermined adjustment items in accordance with the profile before the counted number reaches the predetermined value, the counted number is reset.

Next, the configuration of the image forming apparatus 10 according to the embodiment is explained.

Figure 2:
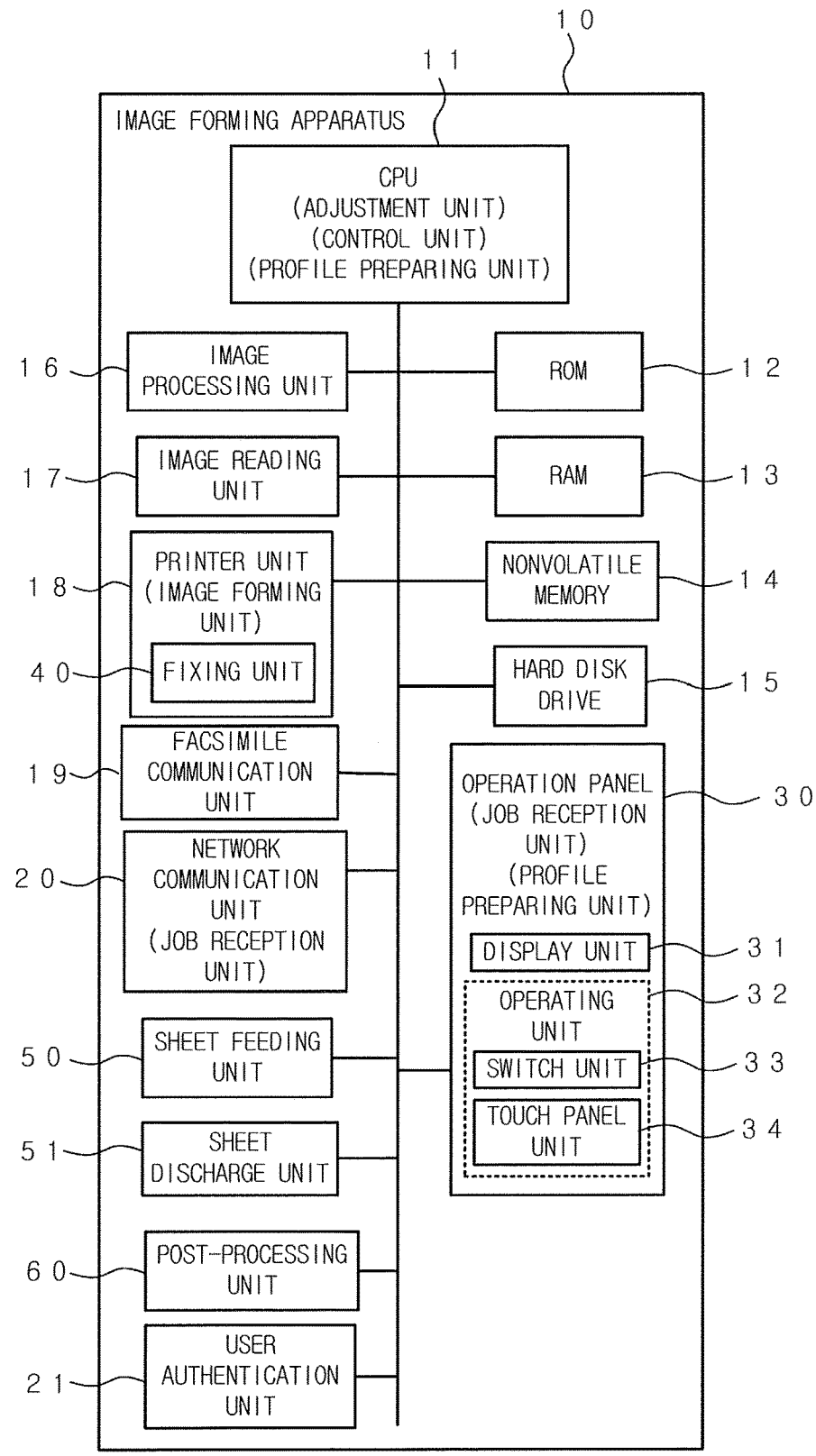
FIG. 2 is a block diagram showing the schematic configuration of the image forming apparatus according to the embodiment.

FIG. 2 is a block diagram showing the schematic configuration of the image forming apparatus 10 according to the embodiment. The image forming apparatus 10 comprises a CPU (Central Processing Unit) 11 for entirely controlling the image forming apparatus 10. The CPU 11 including a microprocessor is connected with a ROM (Read Only Memory) 12, a RAM (Random Access Memory) 13, a nonvolatile memory 14, a hard disk drive 15, an image processing unit 16, an image reading unit 17, the printer unit 18, a facsimile communication unit 19, a network communication unit 20, the sheet feeding unit 50, the sheet discharge unit 51, the post-processing unit 60, a user authentication unit 21 and the operation panel 30 via a bus.

By the CPU 11, a middleware, application programs and the like are executed on an OS (Operating System) program as a base. Further, the CPU 11 has the function as the control unit for controlling the contents displayed on the operation panel 30.

Further, the CPU 11 functions as the adjustment unit for executing the adjustment for the adjustment item relating to the image forming (the image quality secureness adjustment). Further, the CPU 11 functions as a part of the profile preparing unit for registering the adjustment contents of the above image quality secureness adjustment and the setting of the execution starting condition of the image quality secureness adjustment as the profile.

Further, the CPU 11 functions as the control unit for instructing the adjustment unit to execute the above image quality secureness adjustment in accordance with the adjustment contents set in the registered profile in case that the execution starting condition set in the profile is satisfied. In this embodiment, the adjustment unit and the control unit are functioned by the CPU 11. However, the adjustment unit and the control unit may be functioned by the respective hardware processors or the like.

In the ROM 12, various types of programs are stored. By executing various types of processes by the CPU 11 in accordance with these programs, each function of the image forming apparatus 10 is realized. Further, in the ROM 12, the program for controlling the image forming apparatus 10 by the CPU 11 is stored.

The RAM 13 is used as a work memory for temporarily storing various data when the CPU 11 executes the process in accordance with the programs, and as an image memory for storing the image data, and the like.

The nonvolatile memory 14 is a memory (flash memory) in which the stored contents are not damaged even if the image forming apparatus 10 is turned off, and is used for storing various types of settings. The hard disk drive 15 is a large-capacity nonvolatile memory device. In the hard disk drive 15, an OS program, various types of application programs, print data, image data, information histories relating to the jobs and the like are stored. In the embodiment, the profile registered by receiving the user's operation is stored in the hard disk drive 15.

The image processing unit 16 carries out the rasterizing process for converting print data into image data, the compression/decompression process for the image data, and the like in addition to the processings, such as the enlargement/reduction or the rotation of image data.

The image reading unit 17 has the function for obtaining image data by optically reading an image of an original. For example, the image reading unit 17 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 18 has the function for forming an image on the recording sheet in accordance with the image data. In particular, the printer unit 18 functions as the image forming unit for executing the image forming in accordance with the print job. In this embodiment, the printer unit 18 is configured as a so-called laser printer which comprises a conveying device for the recording sheet, a photoconductive drum, a charging device, a laser unit, a developing device, a transfer and separation device, a cleaning device and the fixing unit 40, and which forms an image by the electrophotographic process. Alternatively, an image may be formed by another type of printer.

The facsimile communication unit 19 has the function for transmitting and receiving the image data to/from an external device having the facsimile function via a public line.

The network communication unit 20 has the function for executing the data communication with the portable terminal, another external device and the like via the network, such as LAN. Further, the network communication unit 20 functions as the job reception unit for receiving the print job transmitted from a portable terminal or the like.

The operation panel 30 comprises a display unit 31 and an operating unit 32. The operation panel 30 functions as the job reception unit for receiving the print job directly from a user. Further, the operation panel 30 receives the adjustment contents of the above image quality secureness adjustment and the setting of the execution starting condition of the image quality secureness adjustment, as a part of the profile preparing unit. The operating unit 32 comprises a switch unit 33 having a start button and the like, and a touch panel unit 34. The display unit 31 comprises a liquid crystal display and the like, and has the function for displaying various types of operation windows, setting windows and the like.

The touch panel unit 34 is provided on the display unit 31. The touch panel unit 34 detects the coordinate position on which the display unit 31 is pressed down by a touch pen, the user's finger or the like, and detects a flick operation, a drag operation and the like.

The sheet feeding unit 50 has the function for storing the recording sheets and for feeding the stored recording sheets one by one to the conveying device. In case that an image is formed, the conveying device of the printer unit 18 conveys the recording sheets fed from the sheet feeding unit 50 to the post-processing unit 60.

The post-processing unit 60 carries out the post-processing, such as the staple, the folding or the like, for the recording sheet on which the image is formed, and discharges the post-processed recoding sheet to the sheet discharge unit 51. In case that the post-processing is not set in the print job, the post-processing unit 60 discharges the recording sheet on which the image is formed, to the sheet discharge unit 51 without carrying out the post-processing.

The sheet discharge unit 51 stacks the recording sheets discharged by the post-processing unit 60.

The authentication unit 21 has the function for carrying out the user authentication for a user who will operate the image forming apparatus 10. The method of the user authentication may be a suitable method, such as a method in which a user ID and a password are input or a method in which a user is authenticated by using an ID card or the like. In this embodiment, in case that a user operates the operation panel 30 to use the image forming apparatus 10, the user authentication is always carried out first.

Next, the information included in the profile is explained. When the profile is prepared, a user mainly sets the following three types of adjustment contents (Adjustment Contents 1 to 3).

(Adjustment Contents 1) The selection of the adjustment items to be adjusted in the image quality secureness adjustment and the setting of the adjustment order of the selected adjustment items (Adjustment Contents 2) The setting of the execution starting condition according to the mechanical condition (Adjustment Contents 3) The setting of the execution starting condition according to the image forming condition In the Adjustment Contents 1, the selection of the adjustment item(s) to be adjusted in the image quality secureness adjustment among a plurality of adjustment items is received. Further, the adjustment order in which the selected adjustment items are adjusted is set.

In the Adjustment Contents 2, at least one of the mechanical conditions of the image forming apparatus 10 is determined as the execution starting condition for executing the image quality secureness adjustment. For example, the image forming apparatus 10 can be set so as to execute the image quality secureness adjustment in case that the image forming apparatus 10 is started up for the first time in the day, in case that an image is printed on the predetermined number or more of sheets since the previous image quality secureness adjustment is executed, or in case that the temperature or the humidity of the inside of the image forming apparatus 10 or near the image forming apparatus 10 is changed by the predetermined value or more.

In the Adjustment Contents 3, at least one of the image forming conditions is determined as the execution starting condition for executing the image quality secureness adjustment when the determined image forming condition is set in the print job to be executed next. The image forming condition according to the embodiment, is the contents of the print setting, such as the monochrome printing, the color printing, the type of sheets used in the printing, the value of the image solution, the type of image to be printed (text or picture), and the like. The image forming apparatus 10 can be set so as to execute the image quality secureness adjustment in case that the specific contents are set in the print setting of the print job to be executed next.

Next, the method for preparing the profile according to the embodiment, will be explained. Firstly, a user instructs the operation panel 30 to display the window 130 (See FIG. 6) for showing the list of the registered profiles, and presses down the new registration button 131 (See FIG. 6). The window 130 is an initial window for starting the preparation of the new profile, the deletion of the profile, the edit of the profile, and the like. The window 130 will be explained later.

Figure 3:
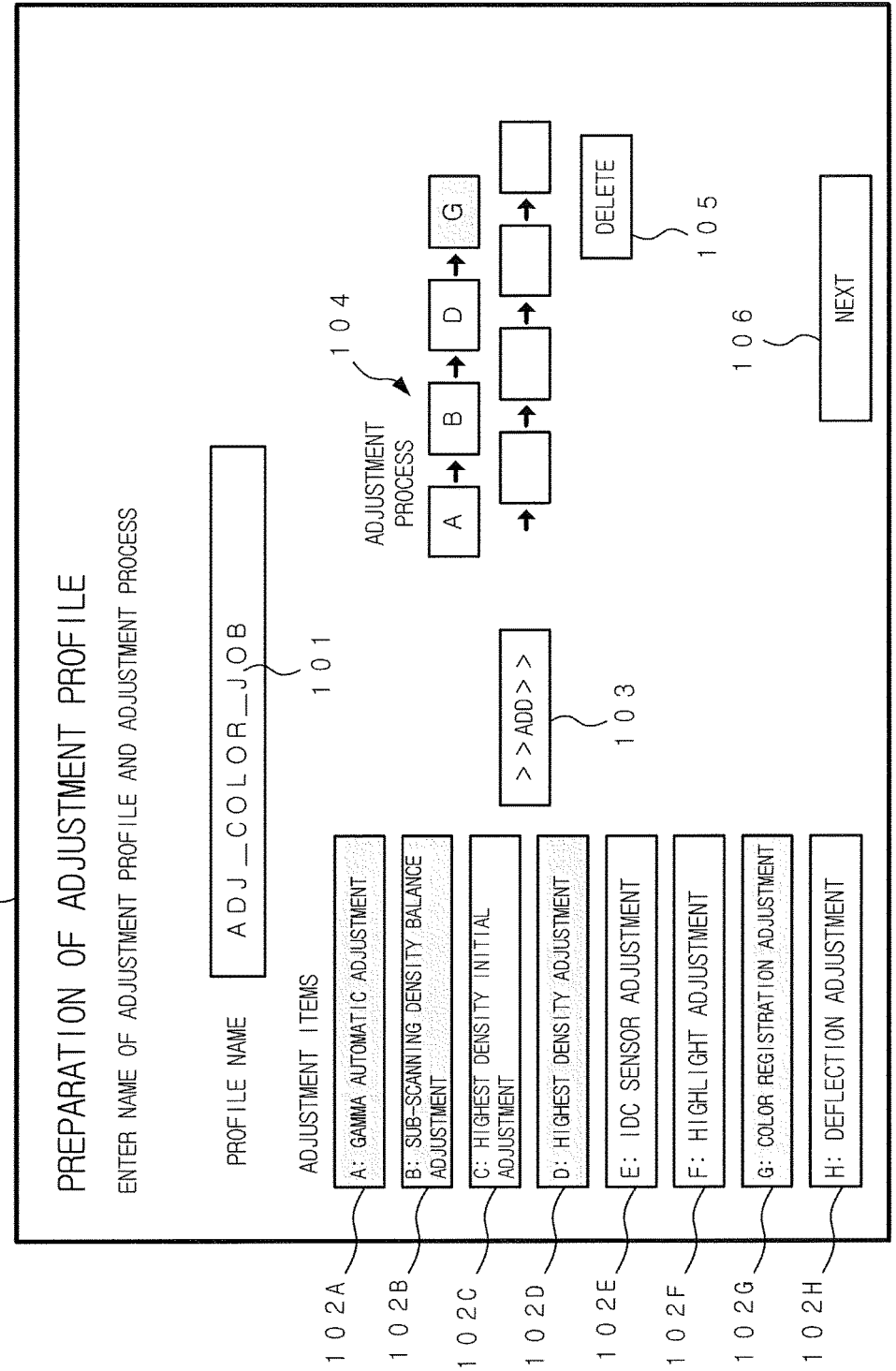
FIG. 3 is a view showing the window for registering the profile and for receiving the selection of the adjustment items to be adjusted and the designation of the adjustment order of the adjustment items.

When the new registration button 131 is pressed down, the image forming apparatus 10 displays the window 100 for setting the contents described in the above-described Adjustment Contents 1. FIG. 3 shows an example of the window 100.

In the window 100, the profile name entry box 101 is a box for setting the profile name. When the profile name entry box 101 is selected, the image forming apparatus 10 displays the keyboard window and receives the setting of an optional name from a user.

In the window 100, with respect to eight adjustment items, the adjustment item selection buttons 102 (A to H) for selecting the adjustment item are displayed. In detail, the adjustment item selection button 102A is an operation button for selecting the Gamma automatic adjustment. The adjustment item selection button 102B is an operation button for selecting the sub-scanning density balance adjustment. The adjustment item selection button 102C is an operation button for selecting the highest density initial adjustment. The adjustment item selection button 102D is an operation button for selecting the highest density adjustment. The adjustment item selection button 102E is an operation button for selecting the IDC (Image Density Control) sensor adjustment. The adjustment item selection button 102F is an operation button for selecting the highlight adjustment. The adjustment item selection button 102G is an operation button for selecting the color registration adjustment. The adjustment item selection button 102H is an operation button for selecting the deflection adjustment.

The addition button 103 is an operation button for adding the adjustment item selected by using the adjustment item selection button 102 to the adjustment item to be adjusted in the image quality secureness adjustment. When a user presses down the addition button 103 after one of the adjustment item selection buttons 102 is selected, the adjustment item corresponding to the selected adjustment item selection button 102 is added to the adjustment process section 104. In case that a plurality of adjustment items to be adjusted are set, the above procedure is repeated. The adjustment order of the adjustment items added in the adjustment process section 104 is set to the order in which each adjustment item 102 is added. The image quality secureness adjustment is executed in the adjustment order which is set as described above.

In the drawing, the adjustment item selection buttons 102 which have been already set in the adjustment process section 104 among the adjustment item selection buttons 102 (A to H), are grayed, and cannot be selected repeatedly.

The delete button 105 is an operation button for deleting the adjustment item which is finally added in the adjustment process section 104, from the adjustment process section 104. In the drawing, the portion showing the adjustment item which is finally added (the portion showing the adjustment item to be deleted by using the delete button 105) among the adjustment item selection buttons 102 which have been already set in the adjustment process section 104, is grayed.

The confirmation button 106 is an operation button for confirming the contents set in the window 100.

Figure 4:
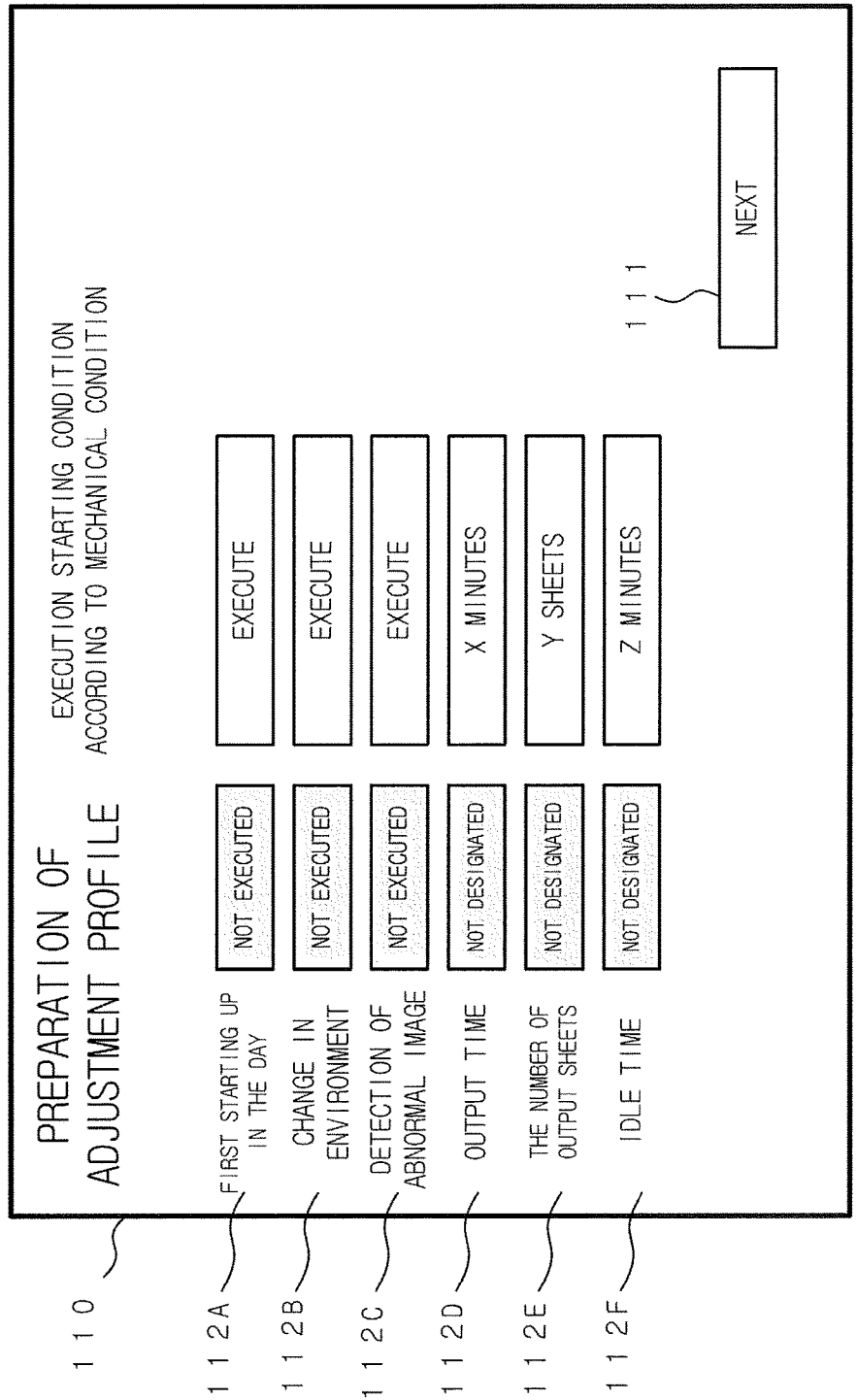
FIG. 4 is a view showing the window for registering the profile and for receiving the designation of the mechanical condition under which the adjustment is executed.

In this embodiment, when the confirmation button 106 is pressed down, the image forming apparatus 10 displays the window 110 for setting the contents described in the above-described Adjustment Contents 2. FIG. 4 shows an example of the window 110.

In the window 110, the mechanical condition starting condition items 112 (A to F) showing the six execution starting conditions relating to the image forming apparatus 10, are displayed. Adjacent to each mechanical condition starting condition item 112, the selection button for switching the status between the validity and the invalidity, and the entry box for setting the detailed contents of the execution starting condition, and the like are displayed.

The execution starting condition shown in the mechanical condition starting condition item 112A is that the image forming apparatus 10 is started up for the first time in the day. In this embodiment, the event in which the image forming apparatus 10 is powered on for the first time in the day is set as the execution starting condition. In case that the selection button "not executed" which is adjacent to the mechanical condition starting condition item 112A is selected, the execution starting condition shown in the mechanical condition starting condition item 112A is invalidated. In case that the selection button "execute" which is adjacent to the mechanical condition starting condition item 112A is selected, the execution starting condition shown in the mechanical condition starting condition item 112A is validated.

The execution starting condition shown in the mechanical condition starting condition item 112B is the change in the environment. In this embodiment, the event in which the temperature or the humidity of the inside of the image forming apparatus 10 or near the image forming apparatus 10 is changed by the predetermined value or more, is set as the execution starting condition. The information relating to the temperature or the humidity may be obtained from an external device, or by providing a thermometer or a hygrometer. In case that the selection button "not executed" which is adjacent to the mechanical condition starting condition item 112B is selected, the execution starting condition shown in the mechanical condition starting condition item 112B is invalidated. In case that the selection button "execute" which is adjacent to the mechanical condition starting condition item 112B is selected, the execution starting condition shown in the mechanical condition starting condition item 112B is validated.

The execution starting condition shown in the mechanical condition starting condition item 112C is the detection of the abnormal image. In the embodiment, the event in which the image forming is judged as the abnormality by comparing the image to be formed by the image forming apparatus 10 with the image which is actually formed on the recording sheet, is set as the execution starting condition. In case that the selection button "not executed" which is adjacent to the mechanical condition starting condition item 112C is selected, the execution starting condition shown in the mechanical condition starting condition item 112C is invalidated. In case that the selection button "execute" which is adjacent to the mechanical condition starting condition item 112C is selected, the execution starting condition shown in the mechanical condition starting condition item 112C is validated.

The execution starting condition shown in the mechanical condition starting condition item 112D is the output time. In this embodiment, the event in which the print total time reaches X (X is an integer having 1 or more) minutes since the previous image quality secureness adjustment is executed, is set as the execution starting condition. In case that the selection button "not designated" which is adjacent to the mechanical condition starting condition item 112D is selected, the execution starting condition shown in the mechanical condition starting condition item 112D is invalidated. In case that the operation for the entry box "X minutes" which is adjacent to the mechanical condition starting condition item 112D is received, the entry of the value of X is received by displaying the numerical keyboard or the like and the execution starting condition shown in the mechanical condition starting condition item 112D is validated.

The execution starting condition shown in the mechanical condition starting condition item 112E is the number of the output sheets. In this embodiment, the event in which the number of the output sheets reaches Y (Y is an integer having 1 or more) since the previous image quality secureness adjustment is executed, is set as the execution starting condition. In case that the selection button "not designated" which is adjacent to the mechanical condition starting condition item 112E is selected, the execution starting condition shown in the mechanical condition starting condition item 112E is invalidated. In case that the operation for the entry box "Y sheets" which is adjacent to the mechanical condition starting condition item 112E is received, the entry of the value of Y is received by displaying the numerical keyboard or the like and the execution starting condition shown in the mechanical condition starting condition item 112E is validated.

The execution starting condition shown in the mechanical condition starting condition item 112F is the idle time. In this embodiment, the event in which the image forming apparatus 10 does not execute a print job for Z (Z is an integer having 1 or more) minutes, is set as the execution starting condition. In case that the selection button "not designated" which is adjacent to the mechanical condition starting condition item 112F is selected, the execution starting condition shown in the mechanical condition starting condition item 112F is invalidated. In case that the operation for the entry box "Z minutes" which is adjacent to the mechanical condition starting condition item 112F is received, the entry of the value of Z is received by displaying the numerical keyboard or the like and the execution starting condition shown in the mechanical condition starting condition item 112F is validated.

In the window 110, the selected selection button and the entry box in which the value is entered are grayed. The confirmation button 111 is an operation button for confirming the contents set in the window 110.

Figure 5:
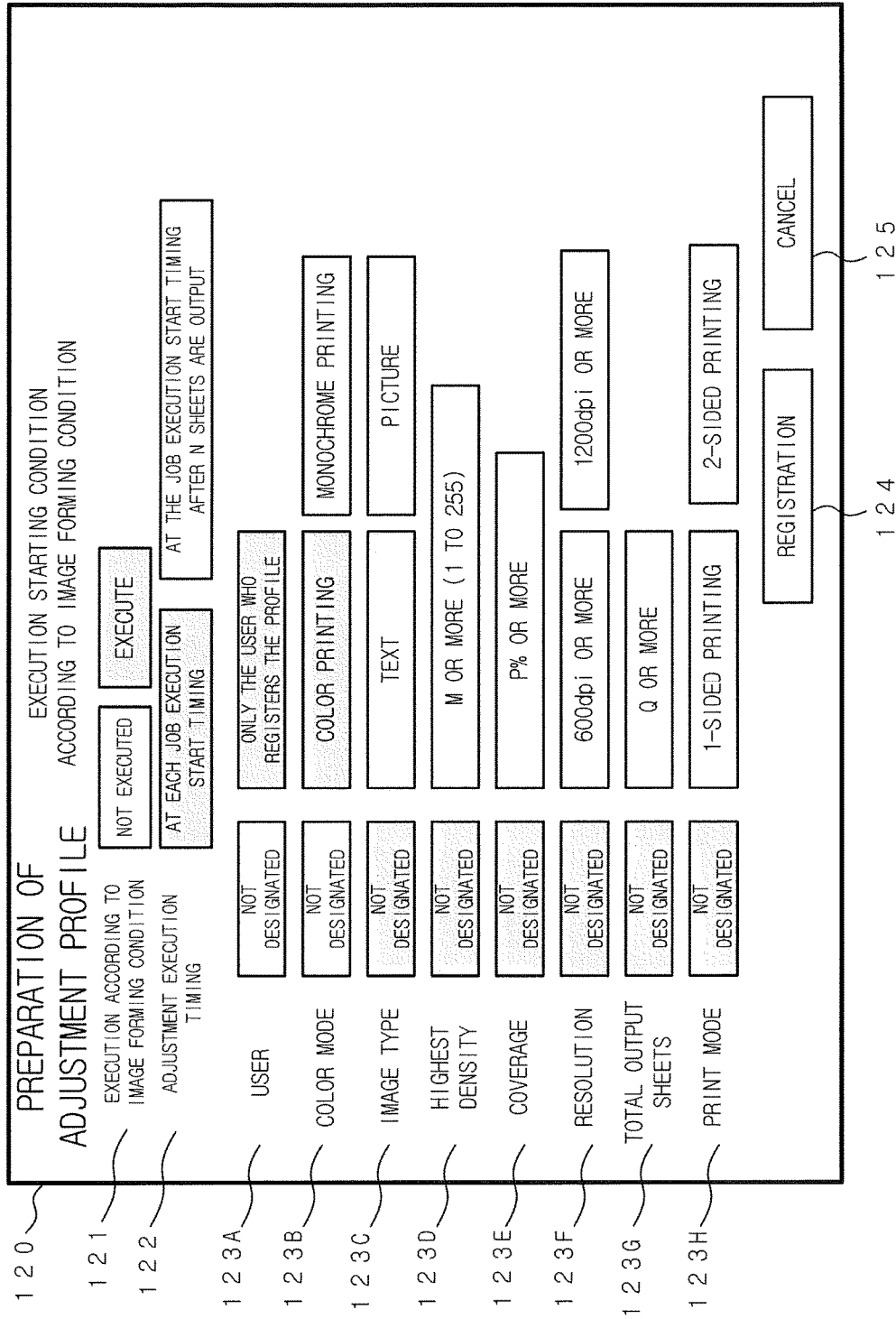
FIG. 5 is a view showing the window for registering the profile and for receiving the designation of the image forming condition for instructing the image forming apparatus to execute the adjustment when the designated image forming condition is satisfied.

In the embodiment, when the confirmation button 111 is pressed down, the image forming apparatus 10 displays the window 120 for setting the contents described in the above-described Adjustment Contents 3. FIG. 5 shows an example of the window 120.

In the window 120, the batch setting item 121 (in the drawing, referred to as "Execution according to Image forming condition"), the adjustment execution timing setting item 122 (in the drawing, referred to as "Adjustment execution timing") and eight print setting execution starting condition setting items 123 (A to H) are displayed. Adjacent to each print setting execution starting condition setting item 123, the selection button for switching the status between the validity and the invalidity, and the entry box for setting the detailed contents of the execution starting condition, and the like are displayed. The validity or the invalidity of each execution starting condition can be set.

Adjacent to the batch setting item 121, the selection button for switching the status between the validity and the invalidity batchedly for the execution starting conditions which are validated among the execution starting conditions which are validated or invalidated individually by using each print setting execution starting condition setting item 123, is displayed. In case that the selection button "not executed" which is displayed adjacent to the batch setting item 121 is selected, all of the execution starting conditions shown in the print setting execution starting condition setting items 123 (A to H) are batchedly invalidated.

In this embodiment, in case that the selection button "not executed" which is displayed adjacent to the batch setting item 121 is selected, the validity and the invalidity of each execution starting condition cannot be set by using the print setting execution starting condition setting items 123. In case that the selection button "execute" which is displayed adjacent to the batch setting item 121 is selected, the validity and the invalidity of each execution starting condition can be set individually by using the print setting execution starting condition setting items 123.

Adjacent to the adjustment execution timing setting item 122, the selection button and the entry box for setting the timing at which it is checked whether the execution starting condition according to the image forming condition shown in each print setting execution starting condition setting item 123 is satisfied, are displayed.

In case that the selection button "at each job execution start timing" which is displayed adjacent to the adjustment execution timing setting item 122 is selected, the image forming apparatus 10 checks whether the execution starting condition is satisfied before each print job is executed. Then, when the execution starting condition is satisfied, the image quality secureness adjustment is executed.

In case that the operation for the entry box "at the job execution start timing after N sheets are output" which is displayed adjacent to the adjustment execution timing setting item 122 is received, the entry of the value of N is received by displaying the numerical keyboard or the like. In case that the image forming apparatus 10 receives the entry of the value of N, the image forming apparatus 10 does not check whether the execution starting condition is satisfied, until N sheets are output since the previous image quality secureness adjustment is executed. After N sheets are output, the image forming apparatus 10 checks whether the execution starting condition is satisfied before each print job is executed.

Next, the execution starting conditions shown in eight print setting execution starting condition setting items 123 (A to H) will be explained in detail.

In the print setting execution starting condition setting item 123A (in the drawing, the setting item of "user"), the execution starting condition is set as follows: Only when the user who enters the print job is coincident with the user who prepares the profile, the image quality secureness adjustment is executed in accordance with the adjustment contents set in the prepared profile, or when any user enters the print job, the image quality secureness adjustment is executed. In case that the selection button "only the user who registers the profile" is selected, when the user who enters the print job is coincident with the user who prepares the profile, the image quality secureness adjustment set in the profile prepared by the user who enters the print job is executed in accordance with the other execution starting conditions. On the other hand, when the user who enters the print job is not coincident with the user who prepares the profile, the image quality secureness adjustment set in the profile is not executed even though the other execution starting conditions are satisfied. In case that the selection button "not designated" is selected, it is judged whether the image quality sureness adjustment set in the prepared profile is executed or not in accordance with the other execution starting conditions without considering whether the user who enters the print job is coincident with the user who prepares the profile or not.

Therefore, when one user enters the print job, the image quality sureness adjustment set in the profile registered by another user can be prevented from being unintentionally executed. In this embodiment, when the profile is prepared, the logged-in user is related to the profile as the user who prepares the profile. However, by receiving the user information, the user specified in the received user information may be related to the profile as the user who prepares the profile. Further, a plurality of users may be related to the profile. Alternatively, instead of the specific user, the status of the user (for example, the administrator, the manager or the like) or the like may be related to the profile.

In the print setting execution starting condition setting item 123B (in the drawing, the setting item of "color mode"), it is possible to switch the execution starting condition between the color printing and the monochrome printing, or the color/monochrome printing is not considered as the execution starting condition (not designated). In case that the selection button "not designated" is selected, it is judged whether the image quality sureness adjustment set in the prepared profile is executed or not in accordance with the other execution starting conditions without considering the color/monochrome printing. In case that the selection button "color printing" or "monochrome printing" is selected, it is judged whether the image quality sureness adjustment set in the prepared profile is executed or not according to whether the printing set in the print job is the printing selected by using the selection button, as one execution starting condition.

In the print setting execution starting condition setting item 123C (in the drawing, the setting item of "image type"), it is possible to switch the execution starting condition between the case in which the image to be printed is a text and the case in which the image to be printed is a picture, or the image type (text/picture) is not considered as the execution starting condition (not designated). In case that the selection button "not designated" is selected, it is judged whether the image quality sureness adjustment set in the prepared profile is executed or not in accordance with the other execution starting conditions without considering that the image to be printed is a text or a picture. In case that the selection button "text" or "picture" is selected, it is judged whether the image quality sureness adjustment set in the prepared profile is executed or not according to whether the image to be printed is the image type selected by using the selection button, as one execution starting condition.

In the print setting execution starting condition setting item 123D (in the drawing, the setting item of "highest density"), the case in which the highest density in the image to be printed is not less than M (1 to 255) is set as the execution starting condition, or the highest density in the image to be printed is not considered as the execution starting condition (not designated). In case that the selection button "not designated" is selected, it is judged whether the image quality sureness adjustment set in the prepared profile is executed or not in accordance with the other execution starting conditions without considering the highest density in the image to be printed. In case that the operation for the entry box "M or more (1 to 255)" which is displayed adjacent to the print setting execution starting condition setting item 123D is received, the entry of the value (1 to 255) of M is received by displaying the numerical keyboard or the like. Further, it is judged whether the image quality sureness adjustment set in the prepared profile is executed or not according to whether the highest density in the image to be printed is not less than M, as one execution starting condition.

In the print setting execution starting condition setting item 123E (in the drawing, the setting item of "coverage"), the case in which the coverage (coverage rate) is not less than P % is set as the execution starting condition, or the coverage is not considered as the execution starting condition (not designated). In case that the selection button "not designated" is selected, it is judged whether the image quality sureness adjustment set in the prepared profile is executed or not in accordance with the other execution starting conditions without considering the coverage at the printing. In case that the operation for the entry box "P % or more" which is displayed adjacent to the print setting execution starting condition setting item 123E is received, the entry of the value (1 to 100) of P is received by displaying the numerical keyboard or the like. Further, it is judged whether the image quality sureness adjustment set in the prepared profile is executed or not according to whether the coverage at the printing is not less than P %, as one execution starting condition.

In the print setting execution starting condition setting item 123F (in the drawing, the setting item of "resolution"), it is possible to switch the execution starting condition between the case in which the resolution is not more than 600 dpi and the case in which the resolution is not more than 1200 dpi, or the resolution is not considered as the execution starting condition (not designated). In case that the selection button "not designated" is selected, it is judged whether the image quality sureness adjustment set in the prepared profile is executed or not in accordance with the other execution starting conditions without considering the resolution at the printing. In case that the selection button "600 dpi or more" or "1200 dpi or more" is selected, it is judged whether the image quality sureness adjustment set in the prepared profile is executed or not according to whether the resolution set in the print job is the resolution selected by using the selection button, as one execution starting condition.

In the print setting execution starting condition setting item 123G (in the drawing, the setting item of "total output sheets"), the case in which the number of the recording sheets to be used for the printing executed by the print job is not less than Q is set as the execution starting condition, or the number of the recording sheets to be used is not considered as the execution starting condition (not designated). In case that the selection button "not designated" is selected, it is judged whether the image quality sureness adjustment set in the prepared profile is executed or not in accordance with the other execution starting conditions without considering the number of the recording sheets to be used for the printing executed by the print job. In case that the operation for the entry box "Q or more" is received, the entry of the value of Q is received by displaying the numerical keyboard or the like. Further, it is judged whether the image quality sureness adjustment set in the prepared profile is executed or not according to whether the number of the recording sheets to be used for the printing executed by the print job is not less than Q, as one execution starting condition.

In the print setting execution starting condition setting item 123H (in the drawing, the setting item of "print mode"), it is possible to switch the execution starting condition between the case in which the printing set in the print job is 1-sided printing and the case in which the printing set in the print job is 2-sided printing, or 1-sided/2-sided printing is not considered as the execution starting condition (not designated). In case that the selection button "not designated" is selected, it is judged whether the image quality secureness adjustment set in the prepared profile is executed or not in accordance with the other execution starting conditions without considering that the printing set in the print job is 1-sided or 2-sided printing. In case that the selection button "1-sided printing" or "2-sided printing" is selected, it is judged whether the image quality secureness adjustment set in the prepared profile is executed or not according to whether the printing set in the print job is the printing selected by using the selection button, as one execution starting condition.

In the window 120, the selected selection button and the entry box in which the value is entered are grayed.

When the registration button 124 is pressed down, the image forming apparatus 10 confirms the setting contents received in the window 120. Further, the image forming apparatus 10 prepares the profile having the contents set in the window 100, the window 110 and the window 120, and registers the prepared profile in the hard disk drive 15. When the registration of the profile is finished, the window displayed on the display unit 31 returns to the window 130 (See FIG. 6). In case that the cancel button 125 arranged in the window 120 is pressed down, the contents set in the window 100, the window 110 and the window 120 are cancelled and the window displayed on the display unit 31 returns to the window 130.

Figure 6:
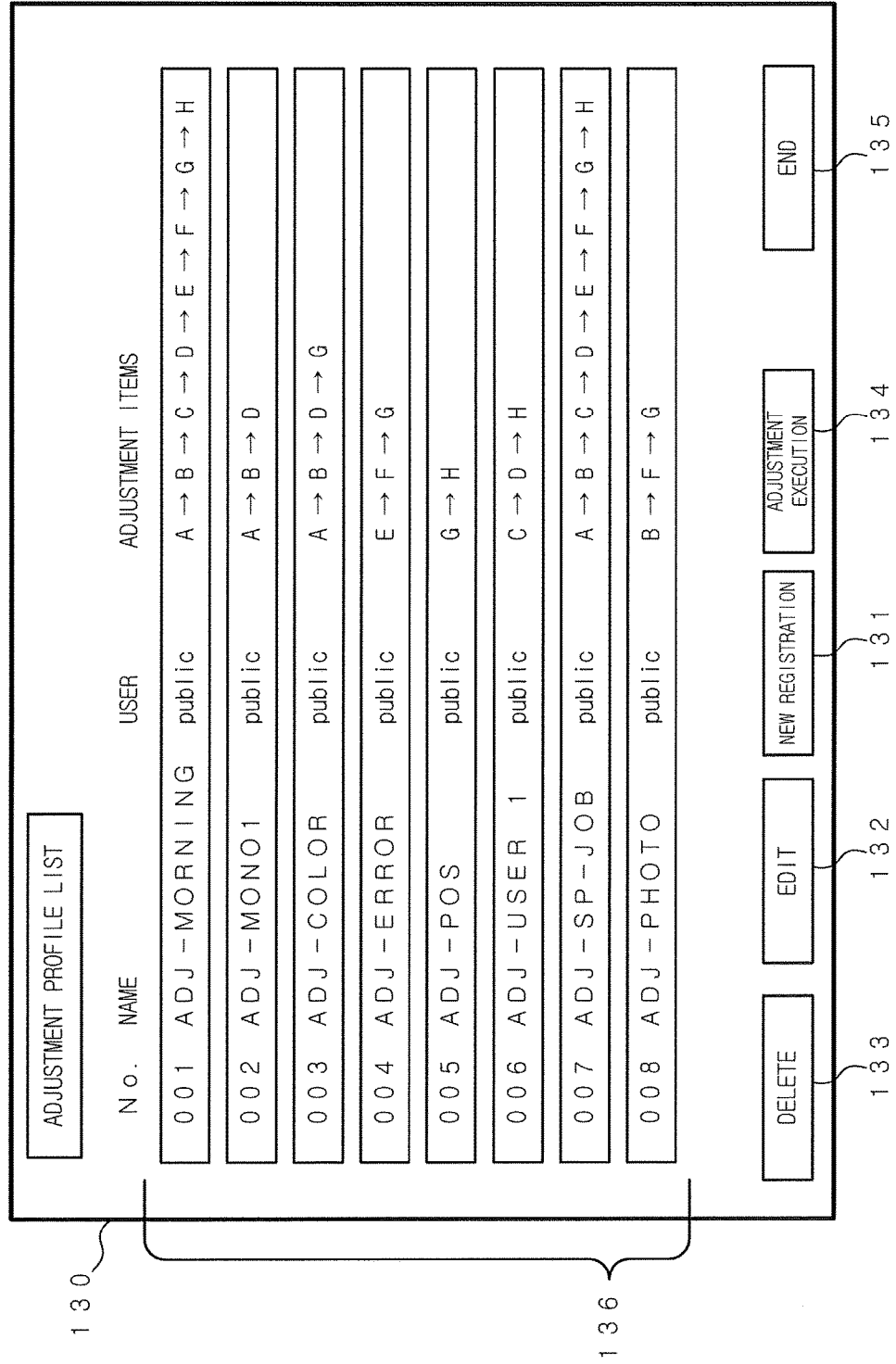
FIG. 6 is a view showing the window including the list of the registered profiles.

FIG. 6 shows an example of the window 130 showing a group of the profiles 136 as a list of the registered profiles. In FIG. 6, eight profiles are registered. The registered profiles are displayed as a group of the profiles 136. In the window 130, in addition to eight profiles, the delete button 133, the edit button 132, the new registration button 131, the adjustment execution button 134, the end button 135 are displayed.

When the delete button 133 is pressed down in the situation in which at least one profile is selected among the profiles displayed in the window 130, the image forming apparatus 10 deletes the selected profile.

When the edit button 132 is pressed down in the situation in which at least one profile is selected among the profiles displayed in the window 130, the image forming apparatus 10 edits the contents of the selected profile. The contents of the selected profile are edited in the window 100, the window 110 and the window 120 as described above. When the registration button 124 is pressed down, the contents set in the window 100, the window 110 and the window 120 are overwritten and saved.

When the new registration button 131 is pressed down, the image forming apparatus 10 prepares a new profile. The new profile is prepared by receiving the setting operation in the window 100, the window 110 and the window 120 as described above.

When the adjustment execution button 134 is pressed down in the situation in which any one of the profiles displayed in the window 130 is selected, the image forming apparatus 10 immediately executes the image quality secureness adjustment in accordance with the contents set in the selected profile.

When the end button 135 is pressed down, the image forming apparatus 10 returns the window from the window 130 to the default window.

Next, the process for executing the image quality secureness adjustment in accordance with the profile by the image forming apparatus 10, will be explained in view of FIG. 7 and FIG. 8.

Figure 7:
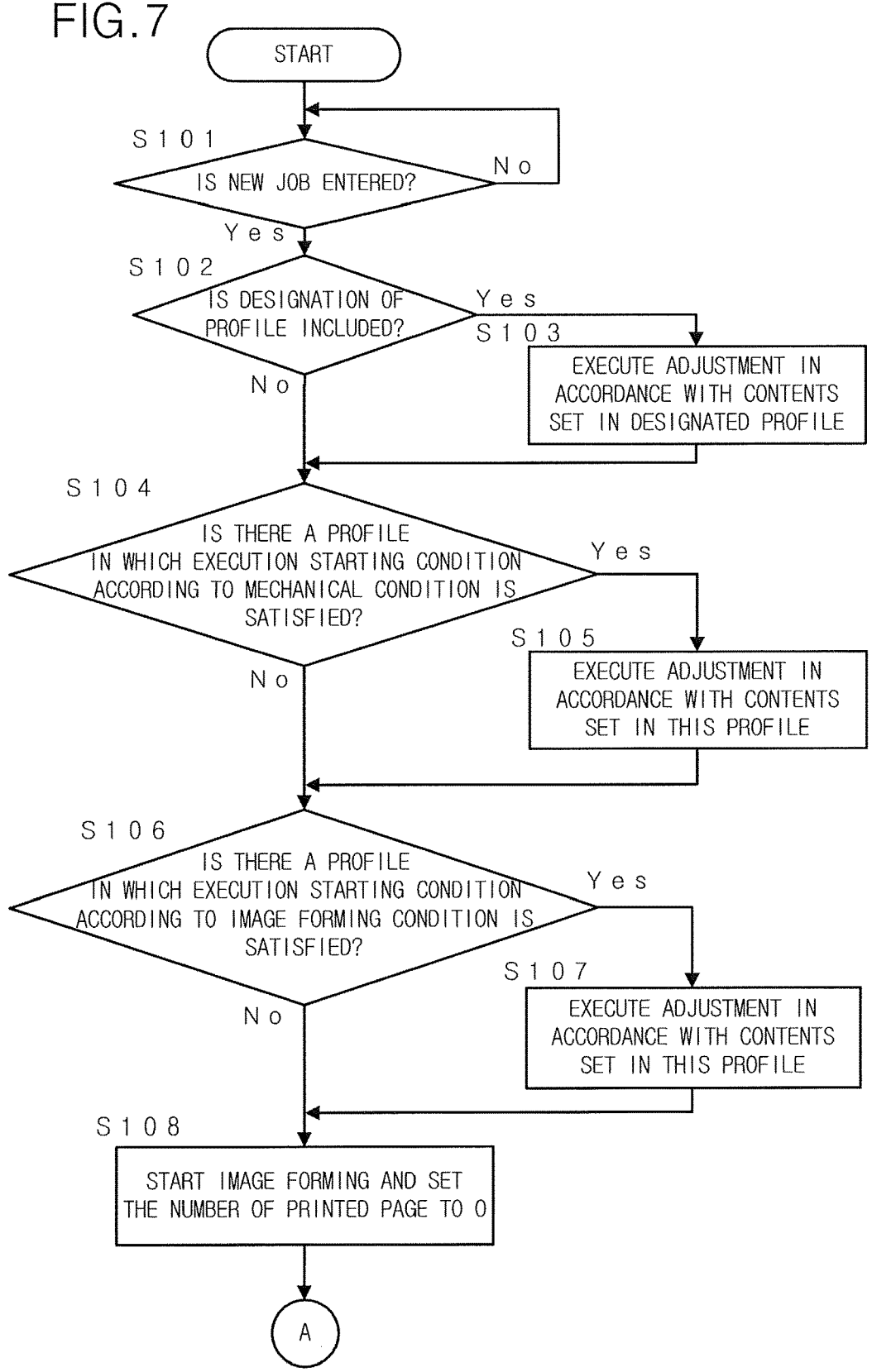
FIGS. 7 and 8 are a flowchart showing the process which is executed when the print job is entered.
Figure 8:
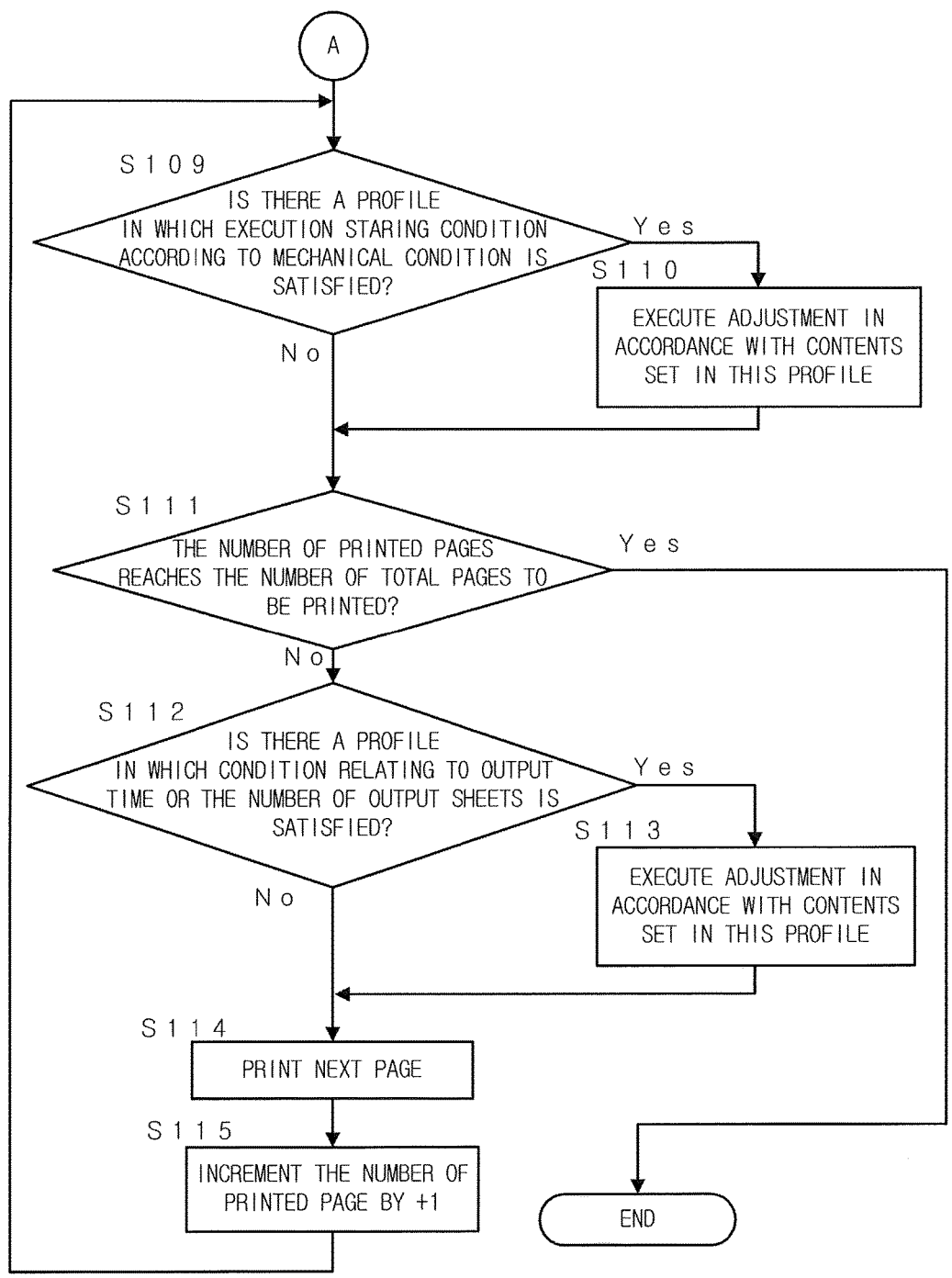

In FIG. 7, the process for executing the image quality secureness adjustment before the received print job is executed, will be explained. Firstly, when a new print job is received (Step S101; Yes), the image forming apparatus 10 judges whether the designation of the profile is included in the print job (Step S102).

In case that the designation of the profile is included in the print job (Step S102; Yes), the image forming apparatus 10 executes the image quality secureness adjustment in accordance with the adjustment contents set in the designated profile (Step S103), and the process proceeds to Step S104.

In case that the designation of the profile is not included in the print job (Step S102; No), the image forming apparatus 10 checks whether there is a profile in which the execution starting condition is satisfied under the current mechanical condition of the image forming apparatus 10 (Step S104).

In case that there is a profile in which the execution starting condition is satisfied under the current mechanical condition of the image forming apparatus 10 (Step S104; Yes), the image forming apparatus 10 executes the image quality secureness adjustment in accordance with the adjustment contents set in the profile in which the execution starting condition is satisfied (Step S105), and the process proceeds to Step S106.

In case that there is no profile in which the execution starting condition is satisfied under the current mechanical condition of the image forming apparatus 10 (Step S104; No), the image forming apparatus 10 checks whether there is a profile in which the execution starting condition is satisfied under the image forming condition of the print job received in Step S101 (Step S106).

In case that there is a profile in which the execution starting condition is satisfied under the image forming condition of the print job received in Step S101 (Step S106; Yes), the image forming apparatus 10 executes the image quality secureness adjustment in accordance with the adjustment contents set in the profile in which the execution starting condition is satisfied (Step S107), and the process proceeds to Step S108.

In case that there is no profile in which the execution starting condition is satisfied under the image forming condition of the print job received in Step S101 (Step S106; No), the image forming apparatus 10 starts forming an image in accordance with the print job and sets the number of the printed pages to 0 (Step S108), and the process proceeds to Step S109 shown in FIG. 8, FIG. 8 shows the process which follows the process shown in FIG. 7 and which is executed during the image forming in accordance with the print job. The image forming apparatus 10 checks whether there is a profile in which the execution starting condition is satisfied under the current mechanical condition of the image forming apparatus 10 (Step S109).

In case that there is a profile in which the execution starting condition is satisfied under the current mechanical condition of the image forming apparatus 10 (Step S109; Yes), the image forming apparatus 10 executes the image quality secureness adjustment in accordance with the adjustment contents set in the profile in which the execution starting condition is satisfied (Step S110), and the process proceeds to Step S111. Step 109 and Step 110 are the process corresponding to the case in which the execution starting condition is satisfied by changing the mechanical condition during the image forming.

In case that there is no profile in which the execution starting condition is satisfied under the current mechanical condition of the image forming apparatus 10 (Step S109; No), the image forming apparatus 10 judges whether the printing executed in accordance with the print job is finished (Step S111).

In case that the number of the printed pages does not reach the number of the total pages to be printed in accordance with the print job (Step S111; No), the image forming apparatus 10 judges that the printing is not finished. Further, the image forming apparatus 10 checks whether there is a profile in which at least one of the execution starting conditions shown in the mechanical condition starting condition item 112D (output time) and the mechanical condition starting condition item 112E (the number of the output sheets) of FIG. 4 is satisfied (Step S112). Specifically, in Step S112, during the printing, it is checked whether there is a profile in which the execution starting condition relating to the number of sheets on which an image is printed after the previous image quality secureness adjustment is executed or the execution starting condition relating to the print total time which is spent after the previous image quality secureness adjustment is executed, is satisfied.

In case that there is a profile in which the execution starting condition is satisfied (Step S112; Yes), the image forming apparatus 10 executes the image quality secureness adjustment in accordance with the adjustment contents set in the profile in which the execution starting condition is satisfied (Step S113), and the process proceeds to Step S114.

In case that there is no profile in which the execution starting condition is satisfied (Step S112; No), the page to be printed next is printed (Step S114) and the number of the printed pages is incremented by +1 (Step S115). Then, the process is continued by returning to Step S109.

Then, the process from Step S109 to Step S115 is repeated, and in case that the number of the printed page reaches the number of the total pages to be printed (Step S111; Yes), the process is ended.

In FIG. 7, in case that a new print job is received, the process is started. However, in case that the received jobs are registered in a job queue in order and the job is executed in the order from the head of the job queue, the process may be started when the execution of the print job registered at the head of the job queue is started.

Next, the process for executing the image quality secureness adjustment in case that there are a plurality of profiles in which the execution starting condition is satisfied, will be explained in view of an example shown in FIG. 9.

Firstly, in case that there are a plurality of profiles in which the execution starting condition is satisfied, the image forming apparatus 10 analyzes the adjustment items to be adjusted in the image quality secureness adjustment set in a plurality of profiles. In case that there is no adjustment item which is overlapped in a plurality of profiles, the image forming apparatus 10 executes the image quality secureness adjustment in accordance with the contents of each profile.

FIG. 9 shows an example in which both of the execution starting conditions of the first profile and the second profile are satisfied and in which there is an adjustment item which is overlapped in the first profile and the second profile. In FIG. 9, the adjustment items to be adjusted in the image quality secureness adjustment set in the first profile and the second profile, and the adjustment order thereof are as follows.

First profile: A, B, C, D and E
Second profile: B, D, C, E and F

In case that there is an adjustment item which is overlapped in the first and the second profiles, the image forming apparatus 10 extracts the adjustment items to be adjusted in the image quality secureness adjustment. With respect to the overlapped adjustment item, only the overlapped adjustment item set in one of the first profile and the second profile is retained and the overlapped adjustment item set in the other profile is deleted. In FIG. 9, because the adjustment items B, C, D and E are overlapped in the first and the second profiles, the overlapped adjustment items set in one of the first and the second profiles are retained, and the overlapped adjustment items set in the other of the first and the second profiles are deleted. As a result, the adjustment items A, B, C, D, E and F are retained.

Next, the image forming apparatus 10 analyzes the adjustment order of the adjustment items in the first and the second profiles. In FIG. 9, the adjustment order of the overlapped adjustment items B, C, D and E is different between the first and the second profiles. In the embodiment, in case that the adjustment order of the adjustment items overlapped in the first and the second profiles is different between the first and the second profiles, the image forming apparatus 10 determines the adjustment order of the overlapped adjustment items by using one of the methods shown in the following (1) and (2).

(1) The adjustment order is determined in accordance with the priority of the profiles.

The priority of each profile is previously set. Then, in consideration of the adjustment order in the profile having the high priority, the adjustment order of the extracted adjustment items is determined. For example, the registration order of the profile is set to the priority of each profile, and the profile which is earlier registered is prioritized. Alternatively, the priority of each profile may be determined by a user.

In FIG. 9, the adjustment order of the overlapped adjustment items B, C, D and E is different between the first and the second profiles. In case that the first profile is prioritized, the adjustment order of the overlapped adjustment items B, C, D and E is set to the order of B, C, D and E, which is the same as that of the first profile. Further, because the adjustment order of the adjustment items A and B is set to the order of A and B in the first profile and the adjustment order of the adjustment items E and F is set to the order to E and F in the second profile, the adjustment order is finally set to the order of A, B, C, D, E and F.

(2) The priority of each adjustment item is previously set, and the adjustment order is determined in accordance with the priority of the each adjustment item.

The priority of each adjustment item is previously determined. In accordance with the priority of each adjustment item, the adjustment order of the extracted adjustment items is determined. In FIG. 9, because the adjustment order of the adjustment items C and D among the overlapped adjustment items is different between the first and the second profiles, in consideration of the priority set to the adjustment items C and D, the adjustment order of the adjustment items C and D is determined. In case that the priority of the adjustment item C is higher than that of the adjustment item D, the adjustment order is finally set to the order of A, B, C, D, E and F.

In the embodiment, it is not necessary to set the priority to all of the adjustment items. For example, in FIG. 9, only the relative priority between the adjustment items C and D is required. Further, in case that the adjustment order of the overlapped adjustment items in the first profile is the same as that in the second profile, the adjustment order of the overlapped adjustment items is determined in accordance with the adjustment order in the first and the second profiles.

In the embodiment, the image forming apparatus 10 necessarily executes the image quality secureness adjustment when the execution starting condition is satisfied. However, the adjustment interval may be secured. In case that the adjustment interval is secured, even though the execution starting condition is satisfied, the next image quality secureness adjustment is not executed until an image is formed on the predetermined number or more of the sheets or the predetermined time elapses since the previous mage quality secureness adjustment is executed. Thereby, it is possible to prevent the image quality secureness adjustment from being executed many times for a short interval.

In the embodiment, the image quality secureness adjustment is executed in case that one execution staring condition is satisfied. However, only when two or more execution starting conditions are satisfied, the image quality secureness adjustment may be executed. Alternatively, only in case that two or more execution starting conditions which can be selected by a user among a plurality of execution starting conditions are satisfied at the same time, the image quality secureness adjustment may be executed.

According to the embodiment, the image forming apparatus 10 registers the profile which is set by a user. When the execution starting condition set in the profile is satisfied, the image forming apparatus 10 executes the image quality secureness adjustment for the adjustment items designated in the profile. Therefore, the adjustment which is intended by a user can be executed automatically at a suitable timing.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the image forming apparatus 10 registers the profile and judges whether the execution starting condition is satisfied. However, the profile may be registered in an external server, and the image forming apparatus 10 may send the information relating to the mechanical condition, the image forming condition and the like to the server to inquire about whether the execution starting condition is satisfied. When the server judges that the execution starting condition is satisfied, the server instructs the image forming apparatus 10 to execute the image quality secureness adjustment in accordance with the adjustment contents set in the profile in which the execution starting condition is satisfied.

In this embodiment, the image forming apparatus receives the adjustment contents for various types of adjustment items relating to the image forming and the setting of the execution starting condition of the adjustment, and registers the adjustment contents and the execution starting condition as the profile. In case that the execution starting condition is satisfied, the image forming apparatus executes the adjustment in accordance with the adjustment contents set in the profile. Therefore, the adjustment which is intended by a user is executed automatically at a suitable timing.

In this embodiment, a user can set the adjustment items to be adjusted and the adjustment order of the adjustment items.

In this embodiment, in case that the designation of the profile is included in the print job to be executed next, the print job is executed after the adjustment is executed in accordance with the adjustment contents set in the designated profile. By including the designation of the profile in the print job, the adjustment is executed before the print job is executed. As a result, the image quality is secured in a specified level or more.

In this embodiment, the execution starting condition includes an event in which the print job to be executed next satisfies a predetermined image forming condition. In case that the print job to be executed next satisfies a predetermined image forming condition, the print job is executed after the adjustment is executed in accordance with the adjustment contents set in the corresponding profile. Therefore, at the execution of the print job, the image quality is secured in a specified level or more. The predetermined image forming condition includes the print setting, such as the color/monochrome printing, the type of the image to be formed (text/picture), the resolution, 1-sided/2-sided printing, and the like.

In this embodiment, the profile is registered so as to relate the information of the user who instructs the profile preparing unit to register the profile. In case that the user who enters the print job to be executed next is not coincident with the user who is related to the profile, the adjustment is not executed in accordance with the adjustment contents set in the profile. Therefore, when one user enters the print job, the adjustment to be executed in accordance with the adjustment contents set in the profile registered by another user can be prevented from being unintentionally executed.

In this embodiment, in order to prevent the adjustment from being executed many times for a short interval, when the adjustment interval is secured, the image forming apparatus does not execute the adjustment until the image forming is executed for predetermined number or more of sheets or a predetermined time elapses since the adjustment is executed.

In this embodiment, when the status of the image forming apparatus satisfies the condition set in the profile, the adjustment is executed in accordance with the adjustment contents set in the profile. For example, the predetermined condition relating to the status of the image forming apparatus includes the first starting up in the day, the idling condition which is continued for a predetermined time, the number of sheets used in the printing after the previous adjustment, the environment temperature, the environment humidity and the like. In case that the adjustment is previously executed according to the status of the image forming apparatus, the adjustment to be executed at the execution of the print job is not required. As a result, the productivity is increased.

In this embodiment, regardless of whether the execution starting condition is satisfied or not, when the designation of the profile and the instruction for executing the adjustment are received from a user, the adjustment is executed in accordance with the adjustment contents set in the designated profile.

In this embodiment, even though the execution starting condition is not set in the profile, when the number of sheets for which the image forming is executed reaches a predetermined value, the adjustment for the predetermined adjustment item is executed and the counted number of the sheets is reset. However, in case that when the adjustment is executed in the adjustment contents set in the profile due to the satisfaction of the execution starting condition, the adjustment for the predetermined adjustment item is executed, the counted number of the sheets is reset.

According to the image forming apparatus, it is possible to execute the adjustment which is intended by a user, automatically at a suitable timing.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus, comprising:
a job receiver that receives a print job;
a printer that executes an image forming in accordance with the print job received by the job receiver; and
a hardware processor that:
receives an adjustment content and a setting of an execution starting condition of an adjustment for an adjustment item relating to the image forming, and registers the adjustment content and the execution starting condition as a profile, the execution starting condition being a mechanical status of the image forming apparatus or a predetermined image forming condition;
when an adjustment interval is secured,
even though the execution starting condition is satisfied, skipping execution of the adjustment in accordance with the adjustment content set in the registered profile until the printer executes the image forming for predetermined number or more of sheets or a predetermined time elapses since the hardware processor executes the adjustment; and
when an adjustment interval is not secured,
executing an adjustment profile in accordance with the adjustment content set in the registered profile when the print job includes a designation of the profile; and
executing the adjustment in accordance with the adjustment content set in the registered profile when the execution starting condition set in the profile is satisfied.

2. The image forming apparatus of claim 1, wherein a number of the adjustment item is 2 or more,
the adjustment content indicates the adjustment items to be adjusted and an adjustment order in which the adjustment for the adjustment items is executed, and
the hardware processor executes the adjustment in the adjustment order.

3. The image forming apparatus of claim 1, wherein when the print job to be executed next includes a designation of the profile, the hardware processor executes the adjustment in accordance with the adjustment content set in the profile designated in the print job before the image forming to be executed in accordance with the print job is executed.

4. The image forming apparatus of claim 1, wherein the execution starting condition includes an event in which the print job to be executed next satisfies the predetermined image forming condition.

5. The image forming apparatus of claim 1, wherein the hardware processor registers a user who instructs the image forming apparatus to register the profile so as to relate the user to the profile, and
when a user who enters the print job to be executed next is not coincident with the user who is related to the profile, the adjustment is not executed in accordance with the adjustment content set in the profile.

6. The image forming apparatus of claim 1, wherein the execution starting condition includes an event in which a predetermined condition relating to the mechanical status of the image forming apparatus is satisfied.

7. The image forming apparatus of claim 1, wherein when a designation of the profile and an instruction for executing the adjustment are received from a user, the hardware processor executes the adjustment in accordance with the adjustment content set in the designated profile.

8. The image forming apparatus of claim 1, wherein the hardware processor counts number of sheets for which the printer executes the image forming,
wherein when the counted number reaches a predetermined value, the hardware processor executes the adjustment for a predetermined adjustment item and resets the counted number, and
wherein when the hardware processor executes the adjustment for the predetermined adjustment item in accordance with the adjustment content set in the profile, the hardware processor resets the counted number.

9. The image forming apparatus of claim 1, wherein the printer executes the image forming when the execution starting condition is satisfied, the image forming being automatically adjusted in accordance with the adjustment content in the registered profile.

* * * * *